Figure 10:
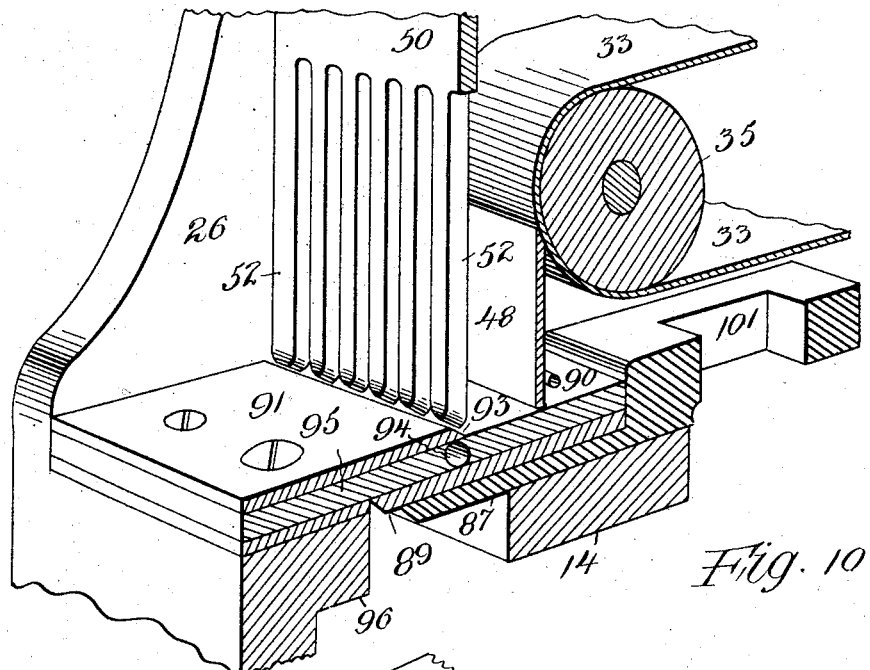

C. SIMON & J. C. DRUCKLIEB.
CIGARETTE MAKING MACHINE.
APPLICATION FILED APR. 30, 1907.
907,188.
Patented Dec. 22, 1908.
9 SHEETS—SHEET 1.
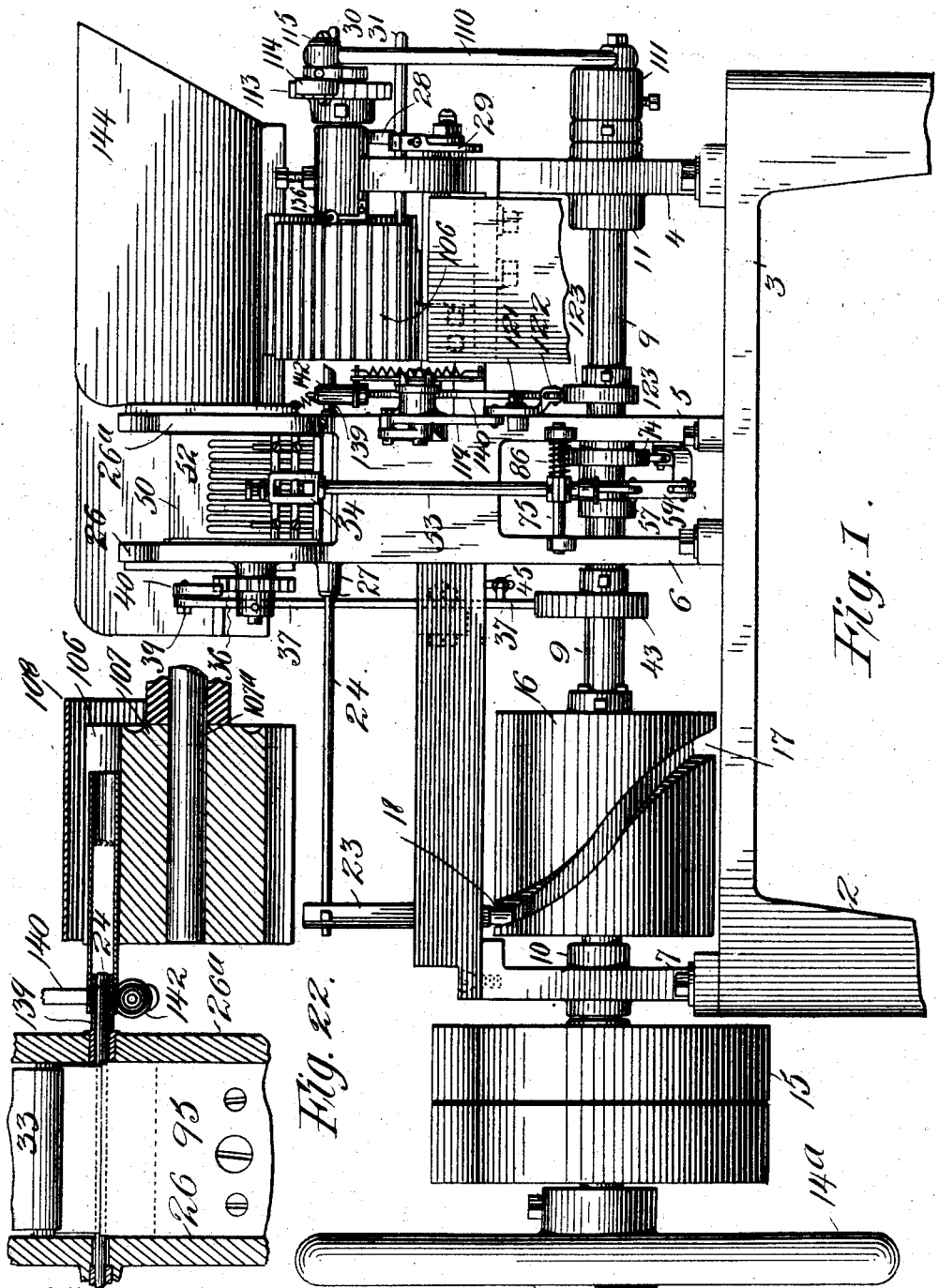

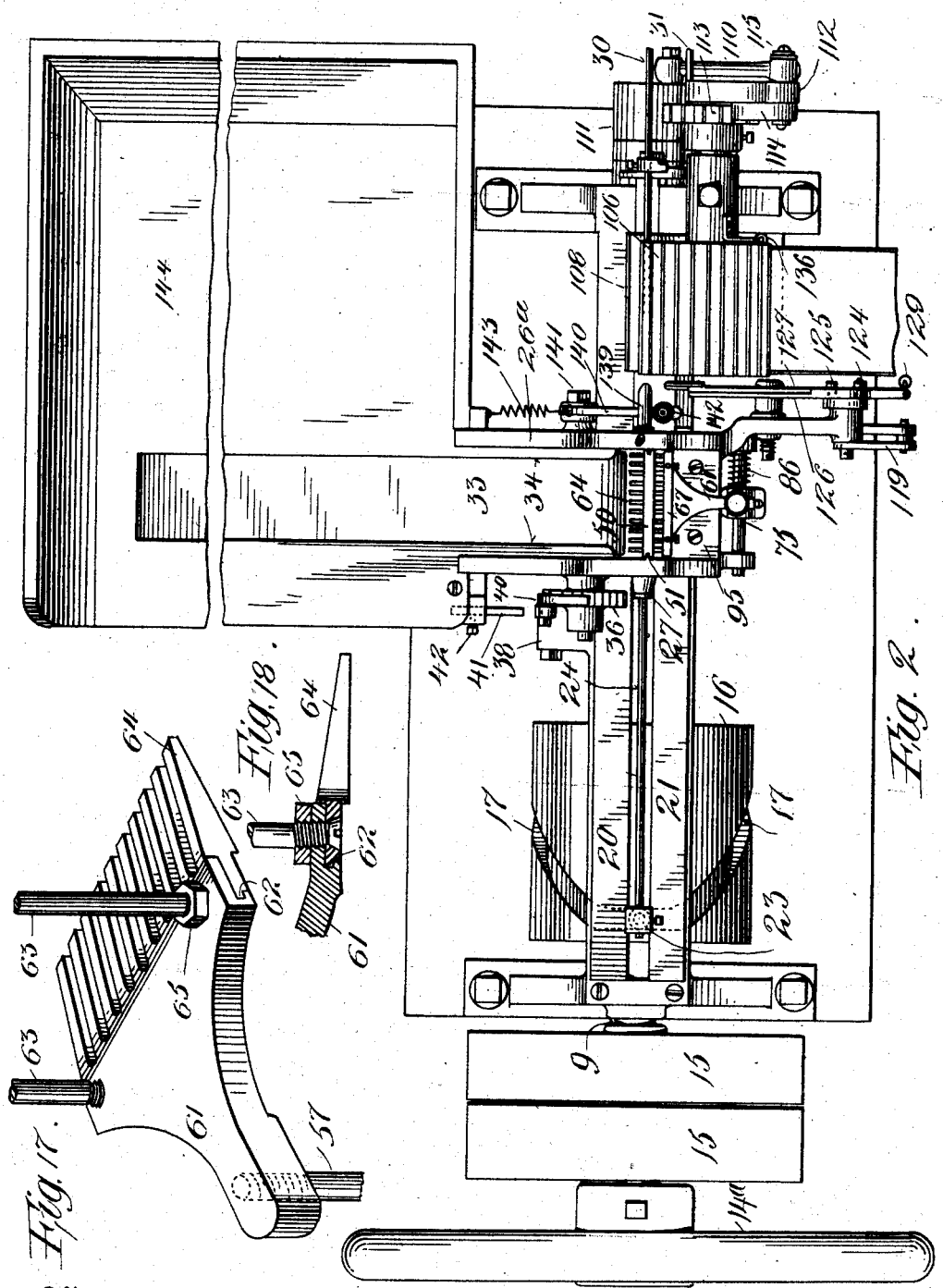

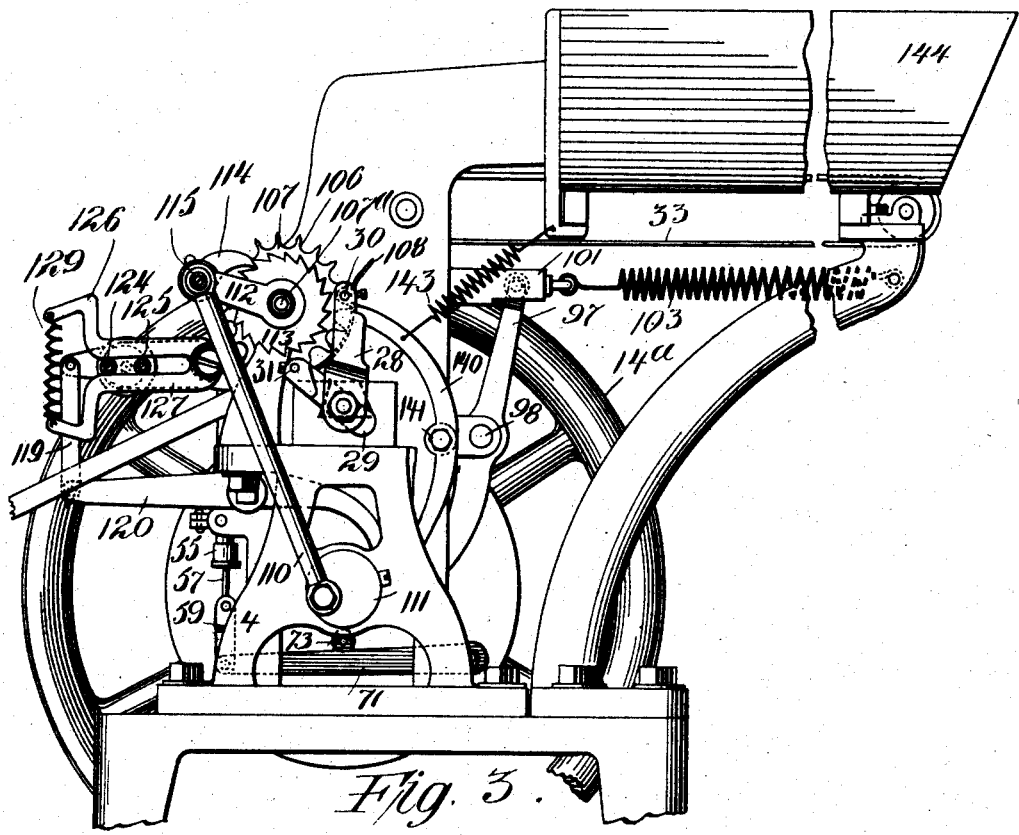

C. SIMON & J. C. DRUCKLIEB.
CIGARETTE MAKING MACHINE.
APPLICATION FILED APR. 30, 1907.
907,188.
Patented Dec. 22, 1908.
9 SHEETS—SHEET 4.
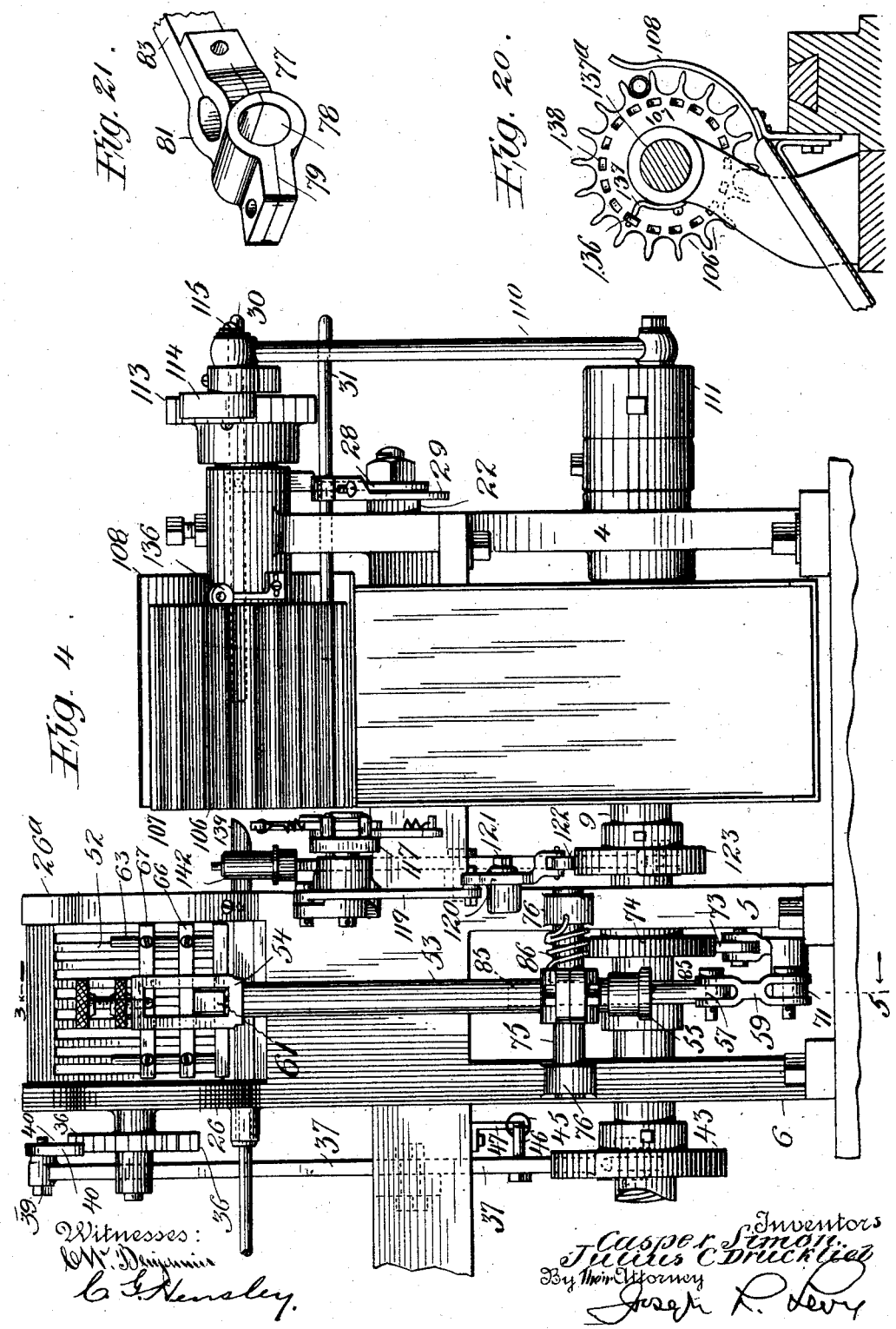

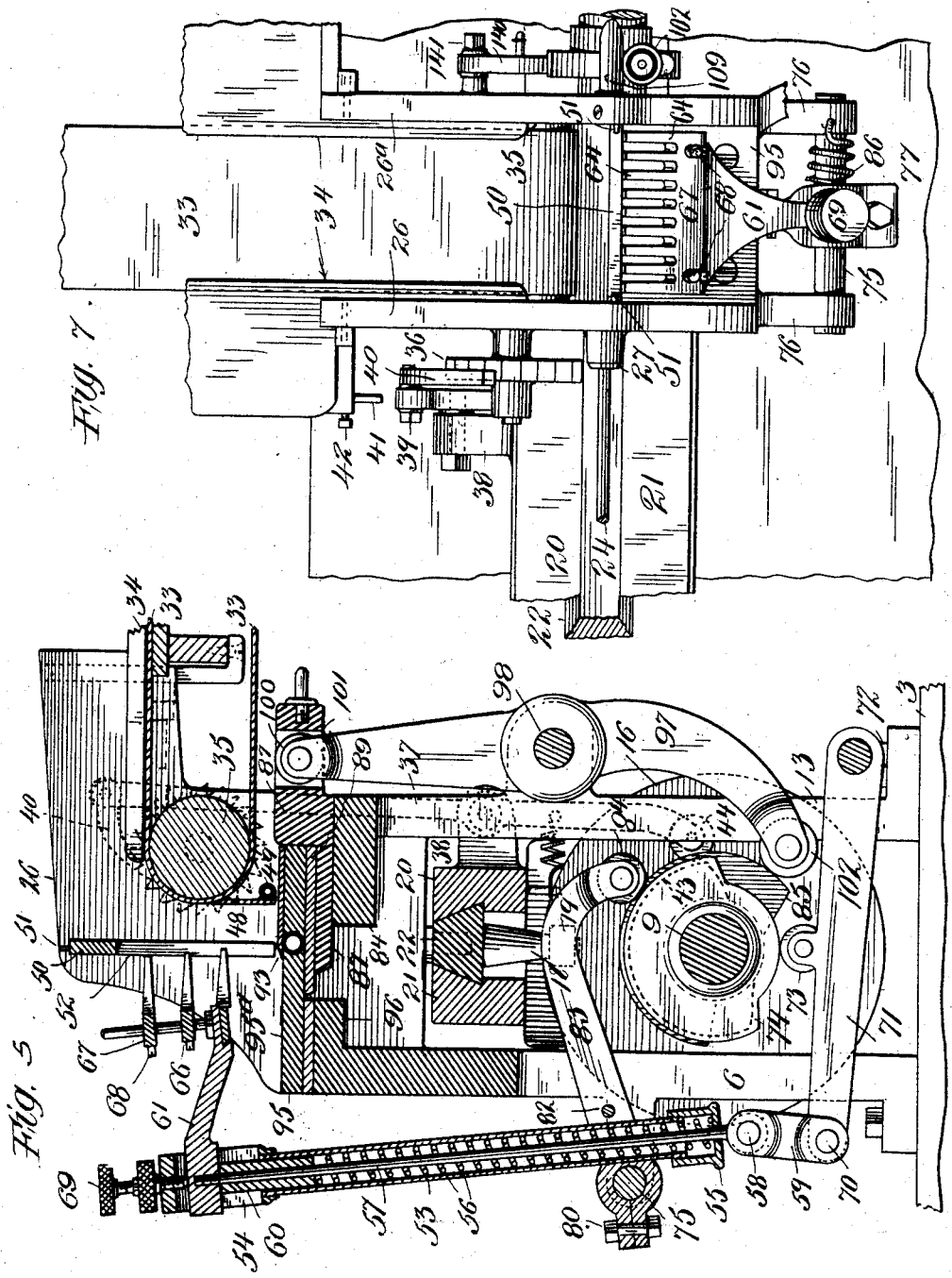

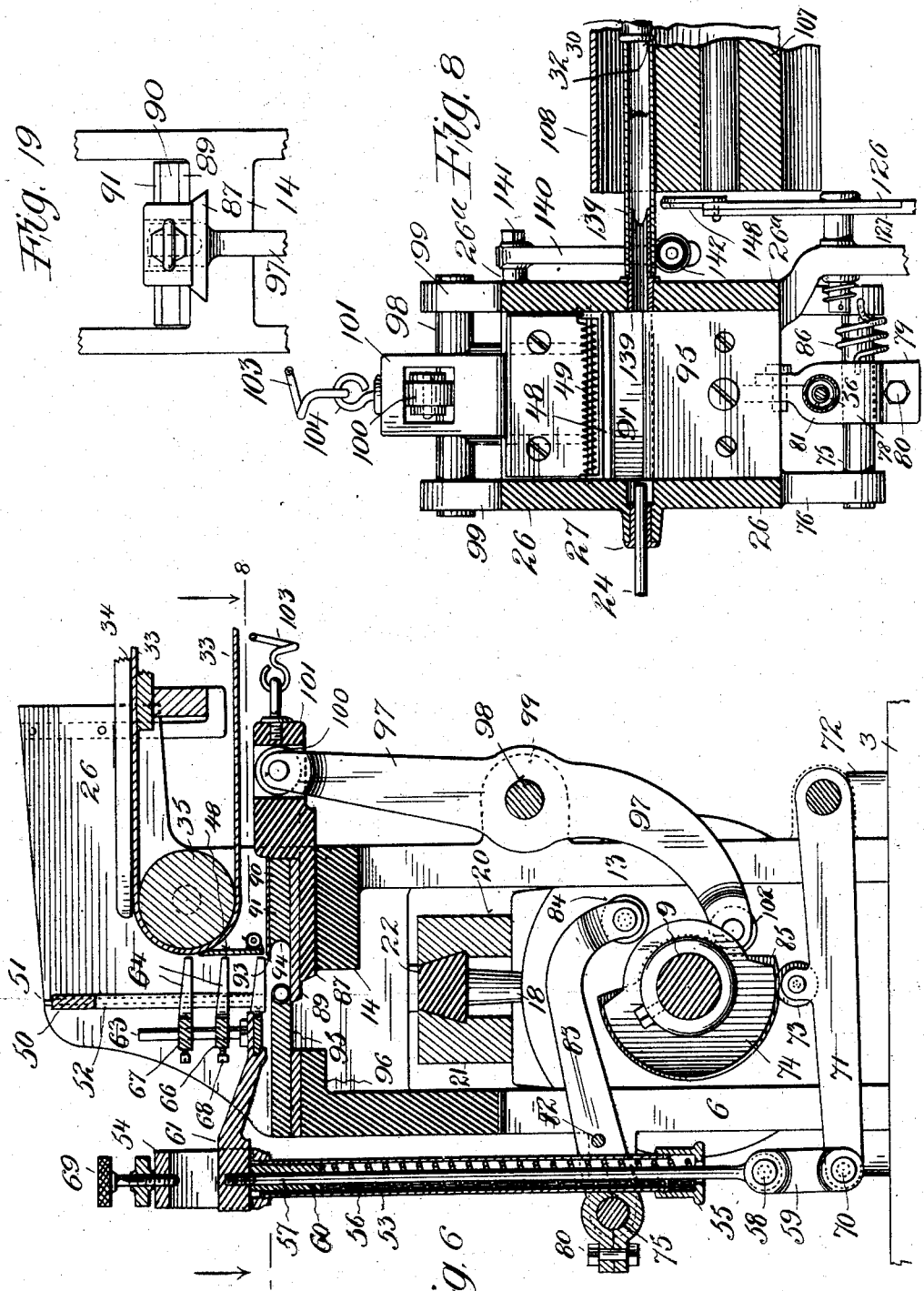

C. SIMON & J. C. DRUCKLIEB.
CIGARETTE MAKING MACHINE.
APPLICATION FILED APR. 30, 1907.
907,188.
Patented Dec. 22, 1908.
9 SHEETS—SHEET 7.
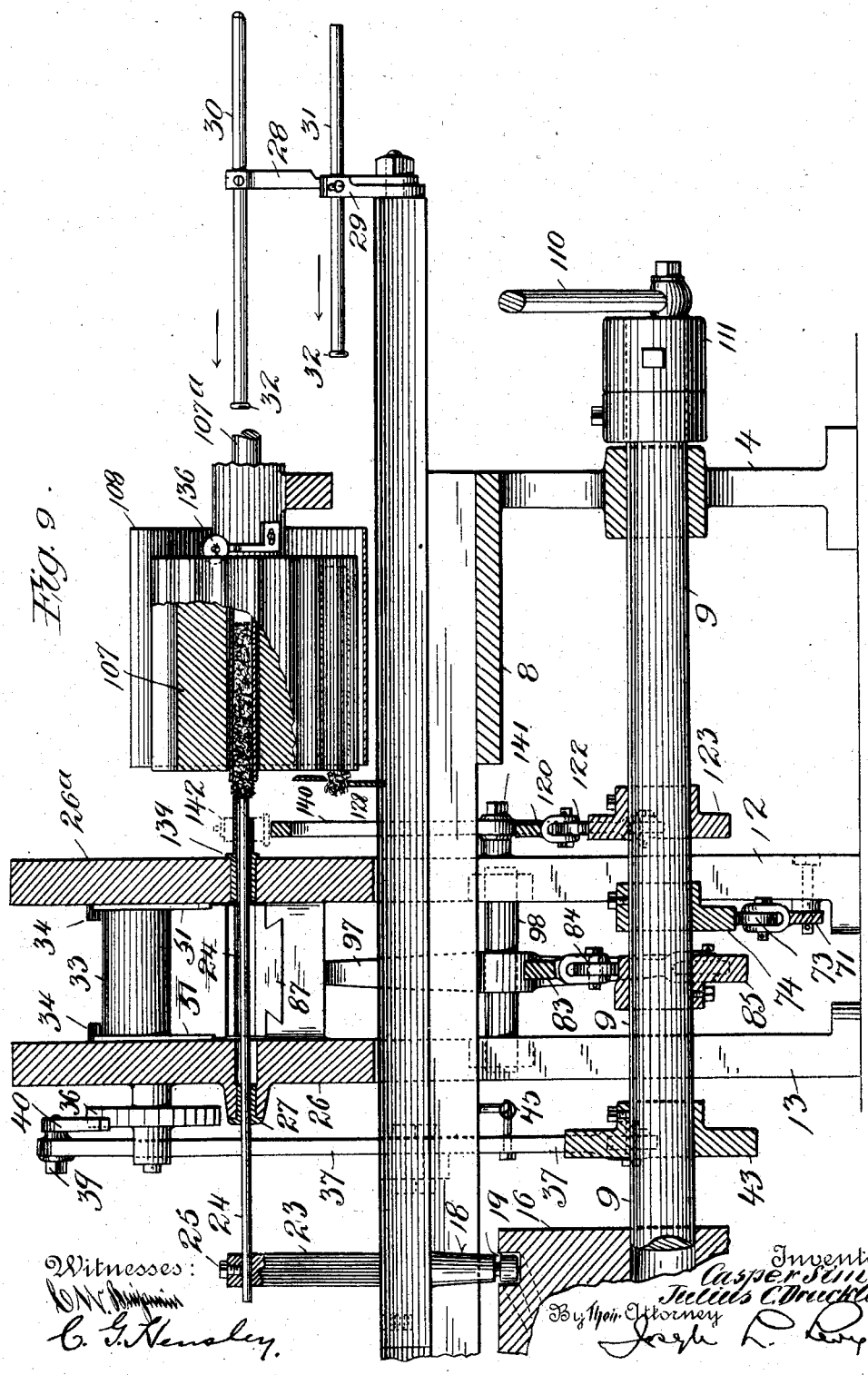

C. SIMON & J. C. DRUCKLIEB.
CIGARETTE MAKING MACHINE.
APPLICATION FILED APR. 30, 1907.

907,188.

Patented Dec. 22, 1908.
9 SHEETS—SHEET 8.

C. SIMON & J. C. DRUCKLIEB.
CIGARETTE MAKING MACHINE.
APPLICATION FILED APR. 30, 1907.
907,188.
Patented Dec. 22, 1908.
9 SHEETS—SHEET 9.
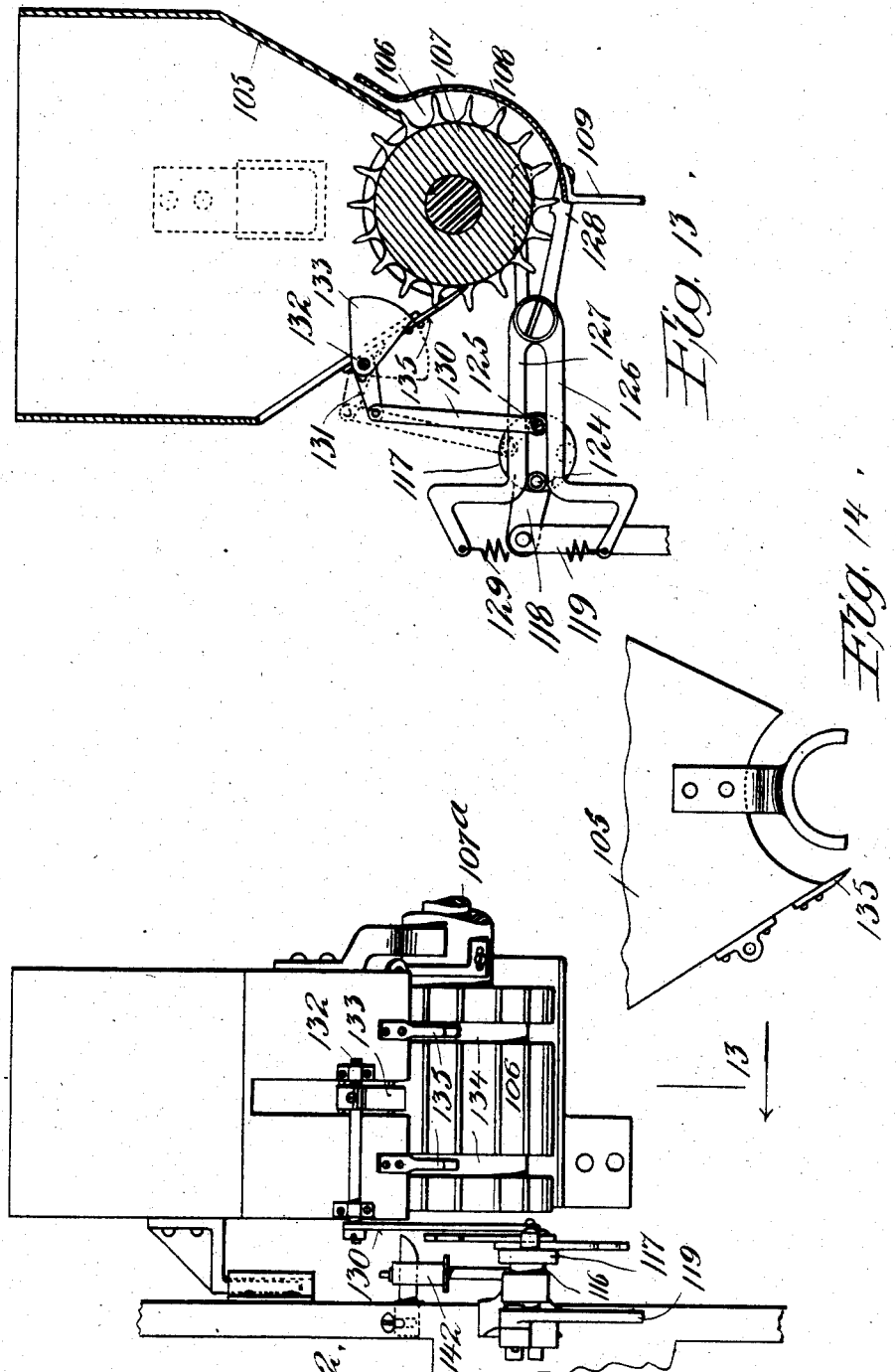

UNITED STATES PATENT OFFICE.

CASPER SIMON, OF WEST HOBOKEN, AND JULIUS C. DRUCKLIEB, OF MONTCLAIR, NEW JERSEY.

CIGARETTE-MAKING MACHINE.

No. 907,188.  Specification of Letters Patent.  Patented Dec. 22, 1908.

Application filed April 30, 1907. Serial No. 371,198.

*To all whom it may concern:*

Be it known that we, CASPER SIMON and JULIUS C. DRUCKLIEB, citizens of the United States, and residents of West Hoboken, in the county of Hudson and State of New Jersey, and Montclair, Essex county, New Jersey, respectively, have invented certain new and useful Improvements in Cigarette-Making Machines, of which the following is a specification.

Our improved machine is especially adapted for making what is known as the Russian form of cigarette, that is, a cigarette with a hollow mouthpiece, although some features may be used for making the ordinary form of cigarette. In a machine of this class, the cartridge for the cigarette is first formed of paper, and in the Russian form of cigarette the cartridge is provided with stiff mouthpiece material and a partition at the inner end of the mouthpiece to keep the tobacco from working up into the hollow mouthpiece. In view of the special advantages of our machine for making such a form of cigarette, we will describe the machine as used for that purpose, although it is understood that as to some features it may be used to good advantage to make the ordinary cigarette.

The object of our invention is to provide a machine, the parts of which will act positively, the movable parts of which will be actuated from a common driving shaft; a reduction of the parts; more efficient means for raking the tobacco into the mold; improvements in the mold and knife which serve to form the tobacco filler and various other features which will appear more fully in the following description of the machine.

Heretofore great trouble has been experienced in a machine in which the tobacco is formed into a filler the size and shape necessary to be pushed into a cartridge because of the difficulties formerly found in a machine for this purpose, pertaining to the molding and cutting of the filler and the arrangement used for raking the tobacco into the mold in such quantities as are necessary and without crowding. It is our object to overcome these difficulties and the parts of our machine for this purpose are especially important.

Our machine will reduce the number of cams and other mechanical movements for operating the various parts, and otherwise increase the efficiency of the machine.

Figure 11:
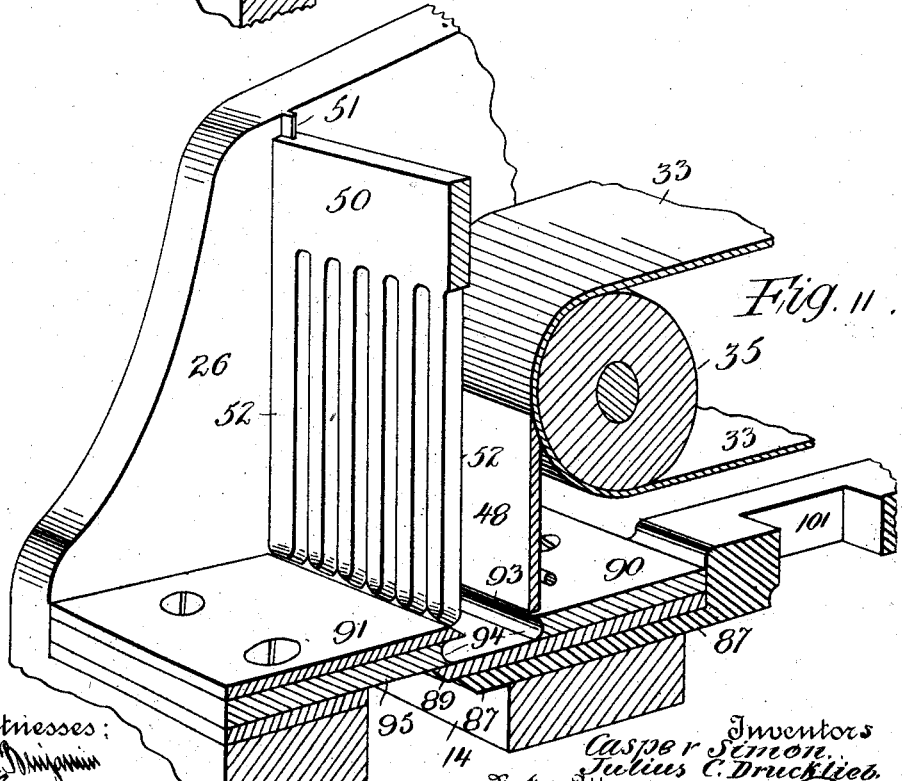

In the drawings forming part of this application, Figure 1 is a front elevation of a machine made in accordance with our invention, in which a hopper for feeding the cartridges has been removed. Fig. 2 is a plan view thereof. Fig. 3 is an end elevation taken from the right hand end. Fig. 4 is a front elevation enlarged, of the operating parts of the machine. Fig. 5 is a vertical section taken on the line 5—5 of Fig. 4 with the parts in one position. Fig. 6 is a similar view with the parts in a different position. Fig. 7 is a plan view of the raking means and belt. Fig. 8 is a section taken on the line 8—8 of Fig. 6. Fig. 9 is a longitudinal section showing the various cam movements. Fig. 10 is a perspective view, partly in section, of a modified form of the feeding and molding mechanism. Fig. 11 is a similar view of the mold in a different position. Fig. 12 is an elevation of the carrier and hopper. Fig. 13 is a section taken on the line 13—13 of Fig. 12. Fig. 14 is an elevation of the lower end of the hopper. Fig. 15 is a perspective view of the mold and knife. Fig. 16 is a similar view of the plate which carries the same. Fig. 17 is a perspective view of the rake. Fig. 18 is a section through the rake. Fig. 19 is an end elevation of the means for reciprocating the knife blade. Fig. 20 is an end elevation of the cigarette carrier. Fig. 21 is a perspective view of the coupling for the rake mechanism, and Fig. 22 is a section through the cigarette carrier and various parts.

The frame of the machine consists primarily, of standards 1 and 2 which support the longitudinal bed 3. From the latter the machine is built upon uprights, or standards, 4, 5, 6 and 7, and upon these there is provided a second platform 8.

The principal parts of the machine, and especially the operating parts, are supported directly by the standards last referred to, and the power operating the various mechanisms consists of a shaft 9 which has a journal 10 in the standards 7 and a journal 11 in the standard 4.

Behind the standards 5 and 6 are similar standards 12 and 13 which support a bed 14 for the purpose of carrying various parts of the machine. The shaft 9 is provided at the left hand end, referring to Fig. 1, with a hand or fly wheel 14ª and a set of pulleys 15, which latter are adapted to be connected with any source of power. On the opposite side of the journal 10, we provide a worm cam 16 which has an oblique groove 17 for operating the post 18 to move various parts which will appear hereafter. The post 18 is provided with a roller or pintle 19 so that the post will be guided freely and smoothly in the groove 17 as the cam 16 is revolved on the shaft. The extreme throw of the post 18 is, of course, determined by the groove 17 which extends nearly the width of the cam 16. There is a platform consisting of two longitudinal members 20 and 21 and a carriage 22 has a mortised engagement with the two members 20 and 21 so that the carriage 22 may move longitudinally, as will appear clearly in Fig. 5, and carry with it certain rods for the purposes which will appear in the description hereafter. Extending upwardly from the carriage 22 and preferably at a point above the post 18 is an upright 23 which has secured to it near the top a longitudinal rod 24, which latter passes through the standard and is secured therein by a set screw 25. This rod 24 is of sufficient length to extend through the upright continuation 26 of the standards where it is journaled by means of a thimble 27 and in which it has longitudinal movement. On the opposite end of this carriage there is provided a plurality of uprights 28 and 29 which carry longitudinal rods 30 and 31, the latter being shorter than the former, spaced apart in pre-determined positions for the purpose which will appear hereafter. These rods 30 and 31 are provided with flanged ends so that the diameter of their ends will be slightly greater than the diameter of the cigarette cartridge. The upright plates 26 and 26ᵃ form a sort of box for guiding the tobacco on a movable belt 33 which latter has projecting over its edges plates 34 to prevent the tobacco carried on the belt 33 from dropping into the working parts of the machine. The belt 33 is continuous and the tobacco for making the cigarette is fed on the same and is carried to a position where it will be fed into the mold. The belt runs over the roller 35 which is journaled in the plates 26 and 26ᵃ with the shaft projecting through the plate 26 where it is provided with a ratchet 36.

There is means provided for intermittently moving the belt 33 so that as each cigarette is filled the belt will be moved forward carrying tobacco on its top surface ready to feed the machine with sufficient tobacco for the next succeeding filler. The mechanism for this purpose consists of a vertical rod 37 which is journaled on a bracket 38 (Fig. 2), and at the upper end this rod has fulcrumed to it by means of a pin 39, a dog 40 which engages the teeth in the ratchet wheel 36 in one direction, so that as the upper end of this rod moves forward it will engage the roller 35 and thus cause the belt to move to a new position.

An attachment consisting of a pin 41 is secured by a nut 42 so as to act as an adjustment stop for the upper end of the arm 37. By this means the arm 37 may be adjusted so that the dog will skip one or more of the teeth in the ratchet 36 at each operation for the purpose of turning the roller 35 for a greater or a less portion of an entire revolution. The means for operating this rod 37 consists of a cam 43 which is secured to the main shaft 9 and the roller 44 on the end of the rod which engages the face of the cam 43 and causes the rod to pivot on its fulcrum in the block 38. Through this action the revolution of the shaft 9 transmits the motion to the ratchet wheel 36 and finally to the belt. As a means for retaining the roller on the end of the arm 47 in continual contact with the cam 43, in so far as the pin 41 will allow of it, we provide a spring 45 which is secured to a pin 46 on the arm 37 and to a bracket 47 on the frame of the machine.

The belt 33 carries the tobacco forward between the plates 26 and 26ᵃ until the belt starts to pass around the roller 35 when the tobacco will commence to drop down in front of the belt. We provide a hinged guard 48 which is hinged between the plates 26 and 26ᵃ and which rests against the belt 33, and a spring 49 which is attached to the pin on which the guard is hinged keeps the upper end of the guard continuously in contact with the belt 33. The purpose of this guard is to keep the tobacco from following the belt and to guide the tobacco to a proper position into the mold. In front of the belt and between the plates 26 and 26ᵃ, there is provided a grate 50 which is secured in position by a tongue and groove connection 51, and the grate has vertical bars 52. Tobacco falling from the movable belt will be maintained in front by the upright bars 52 of this grate.

The mechanism for molding and cutting the filler is disposed below the grate and belt and the details of which will be described hereafter.

Our improvement for feeding the tobacco to the mold is novel, and we will here describe the working parts of it.

There is a casing 53 which has a top frame 64 and a lower cap 55. There is contained in this casing a spiral spring 56 and a vertical rod 57, the latter carrying on its upper end a rake, and being secured at its lower end by pin 58 to the link 59. The rod 57 extends upwardly to a point above the end of the casing 53 and is provided with a sleeve 60 for guiding the rod in the casing. Secured to the upper end of this rod 57 is a rake, the details of which will be more clearly observable in Figs. 5, 17 and 18. It consists of downwardly extending support or plate 61 which is secured upon the end of the rod 57 and on it is attached a set of super-imposed rakes which are adjustable in their relation to each other. The lower one is secured to the plate 61 by a dovetailed joint 62. Upright pins 63 which pass through the plate 61 and lower rake 64 are held by nuts 65 and secure the plate and lower rake together. Other rakes 66 and 67 are secured to these upright pins 63 by means of adjustment screws 68, the rakes having apertures to receive the upright pins 63. Through the use of such screws 68 the two upper rakes may be adjusted in relation to the lower one and in relation to each other.

There is provided on the top of the frame 54, an adjustable bolt 69 which will govern the upward thrust of the plate 61.

The cross pin 75 is held by ears 76 on the standards 5 and 6. On this pin is journaled a bracket 77 which is shown in perspective in Fig. 21. The aperture 78 fits over the pin 75 and the clamp 79 is secured by a bolt 80. On one side of the pin 75 the bracket is formed into a clamp 81 which fits over the casing 53 and is clamped against it by a bolt 82. The entire bracket 77 is formed at the end of a lever 83 which is curved and provided at its end with a roller 84. This roller engages on the face of the cam 85 which latter is secured on the main driving shaft 9, as will be seen in Fig. 9. As the shaft revolves the irregular surface of the cam 85 will cause the lever to rock on its fulcrum, and thus carry the casing 53 with its attached parts back and forward so that the teeth of the various rakes will pass between the bars 52 of the grate and engage the tobacco as it is fed by the belt 33.

The second action of the rakes is caused as follows: The spring inclosed in the casing 53 exerts an upward movement against the sleeve 60 on the rod, and serves to force the rod upward until it contacts with the set screw 69. The lower end of the rod 57, as heretofore stated, has connection with a link 59, and this link 59 through the pin 70 is connected with a cam lever 71. The latter is fulcrumed to a bracket 72 on the opposite side of the machine and has journaled to it on its upper edge a roller 73. This latter roller engages with the surface of a cam 74, shown in Fig. 9, so that as the irregular surface of the cam 74 revolves, the lever 71 will be moved downward at each revolution of the cam against the action of the spring 56. This causes the rakes to move up and down. The first position of these parts is shown in Fig. 5. When the parts are in this position, the lever 83 drops off the cam 85 and carries the rakes forward until they reach a point near the belt 33. The lever 71 then transmits a downward action through the rod 57 when the rake will be brought to the lower position shown in Fig. 6. This action is repeated as often as the shaft 9 revolves and it is independent of the various other mechanical movements of the machine.

The spiral spring 86 surrounds the pin 75 and serves to force the lever 83 downwardly and keep the roller 84 in continuous contact with the face of the cam.

One form of knife and molding mechanism is shown in Figs. 5, 6, 15 and 19. It consists of a reciprocating carrier 87 which is secured to the top plate 14 of the machine by a miter connection, as is shown in Fig. 9, so as to have longitudinal movement backward and forward of the machine. The carrying plate 87 carries with it an under plate 89 on which is super-imposed one-half of the mold 90, and above this is a cutting knife 91, all of which are secured together by screws 92. The cutting edge 93 of the knife extends slightly beyond the concave edge 94 of the mold and the underplate 89 extends some distance beyond the edge of the mold. This concave edge 94 of the mold corresponds in size with one-half of the circumference of a cigarette filler. The other half of the cigarette mold consists of a flat plate 95 which is secured to the upper plate 96 of the frame, and is provided with a concave edge 94, corresponding with the concave edge 94 of the other half of the mold. As will be seen in Fig. 5, the under plate 89 extends under the plate 95, and is adapted to remain partly under the same during the entire movement of the carrying plate 87.

As the tobacco is fed by the belt, the rake brings it down between the grate and the guard 48 and forces it on to the plate 89 when the mold is separated. The carrier 87 is then forced forwardly by means which will be hereinafter explained, when the tobacco lying on the plate 89 between the two halves of the mold will be pressed together to form a filler for the cigarette. The carrier will be forced forward until the edges of the concave sides of the mold come together and by that time the knife edge 93 coming in close proximity to the edge of the mold 95 will cut off the surplus tobacco from the top.

As the plate 89 rests in close touch with both halves of the mold, there is little likelihood of dust or tobacco working between the parts, and if slight particles of dust should get under the plate 95, they will finally work out upon the movement of the plate 89.

By having the mold 90 tightly secured to the underplate 89 so that both move together in close contact with the opposite half of the mold, the efficiency of the machine is greatly increased.

The mechanism for operating the carriage 87 is as follows:—The lever 97 which is disposed substantially vertical, is fulcrumed on a pin 98 to a bracket 99 extending outwardly from the uprights or standards. The upper end of this lever is provided with a roller 100 which engages a rectangular frame 101 on the rear end of the plate 87. The construction of the rectangular frame 101 is clearly shown in Figs. 15 and 16. The lower end of the lever 97 curves inwardly and is provided with a roller 102 which operates on the face of a cam 85, so that as the latter cam revolves, the lever 97 will be forced outwardly and against the upper end of the plate 87, forcing it forward at each revolution of the cam 85. The cam 85 is so made that the lever 97 at the upper end will remain in each of its extreme positions for a period of time which will regulate the parts in relation to every movement of the machine for the purposes hereinafter shown. In order to hold the roller 102 in continuous contact with the face of the cam 85, we provide a spiral spring 103 which is secured to a loop 104 at the rear end of the rectangular frame, and the opposite end of this spring is secured to a part of the frame in such a way as to exert a pull upon the rectangular frame against the action of the cam 85.

The cartridges which are made previous to the forming of a cigarette in our machine, are fed from a hopper 105 to longitudinal grooves 106 on the revoluble carrier 107. This carrier 107 revolves on an axle 107$^a$, and means are provided for giving an intermittent rotation to the carrier.

As will be seen in Fig. 13, the cartridges are all laid in one direction in the hopper, dropping down in longitudinal grooves on the carrier when they revolve part way around therein and are retained during a portion of a revolution by the guard 108 which is secured to a suitable support 109.

Means for intermittently rotating the carrier 107 is also operated directly from the shaft 109 and is shown in Figs. 1 and 3. It consists of a rod 110 which is fulcrumed at its lower end to a collar 111 on the end of the shaft 9, and has pivoted to its upper end a second arm 112 which is connected to the shaft 107$^a$ outside the ratchet wheel 113. The pin 115 which secures the two arms 110 and 112 together, carries on its end a dog 114 which engages in the teeth on the ratchet wheel 113 in one direction. As the collar 111 revolves with the shaft, the motion is transmitted through the arms 110 and 112 to the dog 114 which engages the ratchet and causes the carrier to move a portion of a revolution.

In Figs. 4, 9, and 20, is shown a roller 136 held by support 137 which engages the end of the carrier 107 and enters into the holes 138 so as to hold the carrier from revolving during the filling of a cigarette.

In Figs. 3 and 13, we have illustrated means for trimming the end of the cigarette after it has been filled, and it consists of the following:—The shaft 116 (Fig. 12) projecting from a support on the frame is provided on its outer end with a wheel 117, and at its other end an arm 118 extending forward and connected with a link 119 which extends downwardly and is again connected with the rearwardly extending lever 120. The lever 120 is fulcrumed at 121 (Fig. 4) to a portion of the frame and its rearward end is provided with a roller 122 which engages on the face of the cam 123. As the cam 123 revolves on the shaft 9, it rocks the end of the lever 120 and the motion is transmitted through the link 119 and arm 118 to the wheel 117. Two pins 124 and 125 projecting out from the wheel 117 move between levers 126 and 127 of a pair of shears which force open the jaws 128 of the shears. The rearwardly projecting arms of the shears are provided with a spiral spring 129 which draws them together against the action of the wheel 117. As the action from the cam 123 is transmitted through the various levers, the pins 124 and 125 operate the shears and cause the jaws of the shears to trim the end of the cigarette which is projected out from one of the grooves of the carrier 107. A vertical lever 130 is fulcrumed on pin 125 and operates another lever 131 which is pivoted to a portion of the hopper by means of a pin 132. On the pin 132 is also carried a stirrer 133 which projects through an aperture in the side of the hopper, and is of such a shape that when it is oscillated on the pin 132, it will be forced upward among the cartridges in the hopper and continuously agitate them so that the cartridges will not clog and form a bridge in the hopper. Otherwise the cartridges would occasionally fail to fall into the grooves of the carrier. This agitator does away with the necessity of a person having to continuously agitate the cartridges in the hopper and it is new in this device.

As the lower edge of the agitator 133 does not move above the side of the hopper, there is no likelihood of the cartridges becoming crushed between the agitator and the hopper.

In Fig. 12 is illustrated means for disengaging any of the cigarettes which may follow the carrier after passing from the shears. In this case, the carrier is provided with a plurality of grooves 134 in which two pins 135 projecting downward from the side of the hopper, engage and prevent any cigarettes from following the carrier beyond the pins.

As will be seen in the various views, we have provided in the plate 26$^a$ a nipple 139, the center of which alines with the collar 27 on the plate 26, so that the core of the nipple will receive the rod 24 as it is plunged forward. The end of this nipple is preferably chamfered and projects outwardly from the plate 26$^a$, and is of such a diameter that it will receive the cigarette cartridge on the exterior of it. The rod 24 is adapted to project to the end of the nipple at the extreme thrust.

140 is a lever which is pivoted at 141 to the framing and is provided on its upper end with a concave roller 142 which bears against the cigarette cartridge as it is passed over the nipple 139. For forcing the roller against the nipple, we connect it with the cam movement, as will be seen in the various views. The curved lever 140 is provided at its lower end with another roller which engages with the cam 123, so that as the latter revolves, the roller 142 will be thrown out of contact with the nipple. This is the reverse of several of the cam movements. A spring 143 which is attached to lever 140 is secured to a stationary part of the framework and pulls the lever backward and in contact with the nipple so that the action of spring causes the roller to contact with the nipple and a positive cam action carries it away from it.

The operation of our machine is as follows:—A quantity of tobacco is placed in the first hopper 144 and is gradually fed on the belt 33 in regular quantities. As the belt 33 goes forward, the tobacco is carried and as the belt 33 travels around the roller 35, the tobacco falls in front of the belt between the grate 50 and the guard 48. The rake mechanism which is in the position shown in Fig. 5 is forced backward toward the belt 33 when the rakes are at their highest position until the teeth of the rakes pass between the grate bars 52 and come almost in contact with the belt 33 and guard 48. In doing so, it passes into the tobacco contained in the feed chamber of the machine and as the further cam action lowers the rakes, they press the tobacco thus gathered straight down into the space between the two halves of the mold and on the under plate 89. By regulating the movement of the rod 57 and by regulating the distance between the several rakes, the quantity of tobacco forced down by each operation of the rakes may be regulated according to the size of the cigarette which is to be filled at each operation of the machine. As an illustration, if a large cigarette is to be formed and large molds are being used, the rake is adjusted through the set screw 69 so as to have extreme movement, and the two rakes 66 and 67 are spaced apart so that a greater quantity of tobacco will be forced down by the rakes at each operation. As the belt 33 is moved intermittently by the dog and ratchet mechanism, and as the rake also moves intermittently, the feeding of tobacco ceases while the mold is pressing the filler into shape and while the filler is being placed in the cartridge. After the rake has forced sufficient tobacco between the mold parts, the lever 97 through its cam action forces the carriage 87 forward and the tobacco between the two halves of the mold will be pressed into shape and size necessary for a cigarette. At the same time the edge 93 of the knife cuts off all extra tobacco and there is then prepared a filler sufficient for a single cigarette. A filler thus formed is longer than the space in the cartridge for which it is made and the surplus of tobacco will be cut off, as will be hereinafter shown. After this operation takes place, the two rods 30 and 31 which are carried upon the carriage 22 are forced from right to left when they will enter two of the grooves of the carrier 107 which are presented opposite to them, and the rod 30 will engage the end of an empty cartridge in one of the grooves of the carrier, and force it forward until it passes over the end of the nipple 139. As it does so, the lever 140 moves and the roller 142 impinges against the cartridge and holds it on the end of the nipple. The rod 31 in moving forward, projects the cigarette which has been previously filled, until its end reaches a predetermined distance beyond the end of the carrier 107, and the jaws of the shears cut off the surplus tobacco. After the cartridge has been presented to the end of the nipple, the groove cam 16 reverses the direction of the carriage 22 and forces the rod 24 from left to right when it passes into the space in the mold occupied by the filler and forces the filler through the nipple 139 and into the cigarette cartridge, until the tobacco comes into contact with the mouthpiece partition in the cartridge, when at this point the roller 142 releases the cartridge. A continuation of this action forces the cartridge into its position in the carrier 107. As the roller 142 is adapted to revolve and as the contact against the cartridge is a spring contact, the cartridge will be released from the gripper when the pressure of the rod 24 becomes sufficient. After the cigarette has been trimmed and the carrier 107 is moved, the cigarette will finally pass beyond the guard 108 and drop from the carrier into the proper receptacle. If the cartridges in the hopper 105 should bind or form a bridge, the movement of the agitator will stir them up and prevent their clogging.

In Figs. 10 and 11 is shown a modified form of knife and mold arrangement. In this case, the carrier 87 is provided with an under plate 89, the same as before, and the half 90 of the mold is super-imposed upon the under plate. The opposite half 90 of the mold, however, has above it the knife 91 with its cutting edge projecting beyond its concave edge. In this case the carriage 87 carries the half 90 of the mold forward and the stationary knife 91 cuts off any surplus tobacco through its close contact with the edge of the part 90 of the mold. The advantages of this construction are as follows: The ends of the grate bars 52 may be brought down in close contact with the edge of the knife 91, so that as the mold is brought together, the tobacco will not be crowded out towards the front of the machine and beyond the grate, and likewise, by reason of the close connection which may be made between the guard 48 and the flat surface of the part 90 of the mold, tobacco is prevented from crowding beyond the guard 48.

The advantages of having a movable portion of the mold attached to a movable under plate are that the two halves of the mold are made to register more perfectly with each other and with the knife edge 93 and by reason of the close contact between the movable portion of the mold and the under plate, there is less liability to clog from dust getting under the movable part of the mold.

When a machine has the movable half of the mold traveling over a stationary plate, dust works under the mold and a slight raising of the latter will prevent a proper registering of the halves of the mold and knife. In our machine where slight dust works between the movable under plate and the stationary half of the mold, it will readily work out upon the rearward movement of the under plate.

Having described our invention, what we claim is:—

1. In a cigarette mold, a receptacle for the reception of tobacco and a mold for forming cigarette fillers below the receptacle, a pulley and a belt traveling over the pulley and adapted to feed tobacco to the receptacle, a hinged guard between the belt and mold and forming a portion of the receptacle, having one end resting against the said feeding belt, a spring adapted to keep said guard in contact with the belt and a grate 50 forming another wall of said receptacle.

2. In a cigarette machine, a receptacle for tobacco, a belt engaging over a pulley and adapted to feed tobacco to the receptacle, means for intermittently moving the said belt, a mold for forming cigarette fillers placed below the said receptacle, the side of the receptacle opposite the feeding belt consisting of vertical bars and means for engaging the tobacco through the said bars and raking it into the said mold and means for intermittently operating the said raking means.

3. In a cigarette machine, a receptacle for the reception of tobacco, a mold for forming cigarette fillers, below the receptacle, a belt for feeding tobacco to the receptacle, vertical bars on the side of the receptacle opposite the feeding belt, and means for engaging the tobacco through said bars, said means being adapted to move vertically and rake the tobacco into the said mold.

4. In a cigarette machine, a receptacle for tobacco, means for feeding tobacco into the receptacle, a mold for forming cigarette fillers below the receptacle, the side of the receptacle opposite the feeding means having vertical bars and means passing in and out of the receptacle between the bars and adapted to move vertically in the receptacle and rake the tobacco into the mold.

5. In a cigarette machine, a receptacle for tobacco, means for feeding tobacco into the receptacle, a mold for forming cigarette fillers below the receptacle, the side of the receptacle opposite the feeding means being formed of vertical bars, a rake having teeth adapted to project between the said bars and to move in and out of the said receptacle, and means for intermittently moving the said rake vertically to force the tobacco into the said mold.

6. In a cigarette machine, a receptacle for the reception of tobacco, a mold below the receptacle adapted to form cigarette fillers, one side of the receptacle having vertical bars, a rake consisting of series of super-imposed teeth adapted to project between the said bars and into the receptacle, and means for moving the rake vertically to force the tobacco into the said mold.

7. In a cigarette machine, a receptacle for the reception of tobacco, a mold below the receptacle for forming cigarette fillers, vertical bars on one side of said receptacle, a rake having series of super-imposed teeth, said series being adjustable in relation to each other, the said teeth being adapted to engage tobacco in the receptacle, through the said bars, and means for moving the said rake vertically to force the tobacco into the said mold.

8. In a cigarette machine, a receptacle for the reception of tobacco, means for feeding tobacco to the receptacle, a mold under the receptacle adapted to form cigarette fillers, vertical bars on one side of the said receptacle, a rake comprising a series of super-imposed teeth, the said series being adjustable in relation to each other and the teeth being adapted to engage the tobacco in the receptacle, said rake being adapted to move vertically to rake the tobacco into the said mold and means for adjustably limiting the vertical movement of said rake.

9. In a cigarette machine, a receptacle for the reception of tobacco, a mold below the receptacle and adapted to form cigarette fillers, vertical bars on the side of the said receptacle, a rake having teeth projecting through the bars and moving vertically, said rake having vertical rods to which is attached a series of super-imposed plates which have teeth adapted to project through the bars of the said receptacle and means for moving the rake vertically to rake the tobacco into the said mold.

10. In a cigarette machine, a receptacle, a mold below the receptacle adapted to form cigarette fillers, vertically disposed bars on the side of the said receptacle, a rake having teeth adapted to project between the bars and supported upon a rod, a casing for the rod and a spiral spring therein adapted to raise the rod vertically and means connected with the lower end of the rod adapted to be operated by a cam for intermittently lowering the said rake against the action of the spring.

11. In a cigarette machine, a receptacle, a mold below the receptacle adapted to form cigarette fillers, vertically disposed bars on one side of the receptacle and a rake having teeth adapted to project between the bars, said rake being carried by a rod provided with a casing, a spring therein adapted to force the rod upwardly, a cam operated lever secured to the lower portion of the said rod and adapted to intermittently move the rod downwardly and a second cam operated lever adapted to move the said casing backward and forward whereby the said rake will be projected in and out of the said receptacle.

12. In a cigarette machine, a receptacle, a rake having substantially a vertical movement for raking the tobacco in the receptacle, the rake being carried by a rod provided with a casing, a spring in the casing adapted to force the rod upwardly, a cam operated lever adapted to intermittently force the rod downwardly against the action of the spring, a second cam operated lever journaled upon a shaft and secured to the said casing, said latter lever being adapted to oscillate the casing and rod, and a spring adapted to keep the last mentioned lever in contact with its cam.

13. In a cigarette machine, a rake for raking the tobacco in the receptacle, said rake being secured to a rod provided with a casing, a spiral spring in the casing adapted to force the rod upwardly, a link fulcrumed to the rod, a lever fulcrumed to the said link and adapted to be operated by a cam, a cam-operated lever secured to the said casing and adapted to intermittently oscillate said casing and rod.

14. In a cigarette machine, bed plates 20 and 21, a mold for forming cigarette fillers, a revoluble carrier having grooves adapted to aline with the said mold and separately to receive a cigarette cartridge, a push-rod adapted to force the cartridge to a position near the said mold, another push-rod adapted to engage a completed cigarette in the said revoluble carrier, and another push-rod adapted to force the contents of the mold into the cigarette cartridge held by the revoluble carrier, and a common reciprocating carriage guided between bed plates 20 and 21 on which said push-rods are mounted.

Signed this 29th day of May, 1907.

CASPER SIMON.
JULIUS C. DRUCKLIEB.

Witnesses:
HARRY L. HARRIS,
CHARLES G. HENSLEY